Patented Aug. 11, 1942

2,292,406

UNITED STATES PATENT OFFICE 2,292,406

ETHER RESIN

Henry S. Rothrock, Wilmington, Del., assignor to E. I. du Pont de Nemours & Company, Wilmington, Del., a corporation of Delaware No Drawing. Application August 2, 1940, Serial No. 350,087

14 Claims. (Cl. 260—61)

This invention relates to new compositions of matter and more particularly to improved polyether resins.

The ether resins with which this invention is concerned are of the general type described in Patents 2,060,715, 2,058,510, 2,057,676, 2,060,716 and 2,075,343. As is particularly described in the principal Patent 2,060,715, these ether resins are obtained by reacting certain organic polyhalides with monomeric polyhydric phenols, which latter are preferably in the form of their alkali metal salts. The most desirable method of preparation has consisted in heating under a reflux a mixture of the phenol and aqueous alkali with the polyhalide in chemically equivalent amount. The refluxing is continued until a test portion of distillate is clear, after which the water is removed by distillation in order that the low molecular weight product may be heated at temperature sufficiently high to yield the desired highly condensed resin. The viscous anhydrous final reaction mass is opaque because of occluded salt, e. g., sodium chloride, which must be washed out with water at a temperature above the softening point of the resin.

The commercial utilization of these resins has been retarded by manufacturing difficulties and by certain properties of the resins. These disadvantages include: the drastic time and temperature conditions ordinarily necessary to complete the reaction after the water is distilled off; the difficulty of removing occluded salt from the anhydrous final reaction mass; the substantially permanent fusibility and solubility of the resins; and their fairly low softening temperatures.

This invention has as a general object a method for overcoming the above mentioned difficulties which have previously attended the manufacture of ether resins of the present type. A further object is a method for making the ether resins by means of which the occluded salt is easily removed. A further object is the production of resins of this kind which are characterized by valuable improvements in physical properties. A still further object is the manufacture of new and useful resinous compositions. Other objects will appear hereinafter.

The above objects are accomplished by reacting the above described ether resins with a polyisocyanate polyisothiocyanate, or isocynate-isothiocyanate. Comprehensively, these are compounds containing a plurality of —NCX groups, in which X is an element of group VI of the periodic table having an atomic weight less than 33, i. e., oxygen or sulfur.

The diisocyanate treatment may be applied to either the fully condensed resin or to the incompletely condensed resin obtained by stopping the usual resin-making process at an intermediate stage. In either case the treated resin shows greatly improved film properties, such as greater adhesion, toughness, and water and solvent resistance. It is preferred, however, to apply the treatment to the partially made resin because of the several additional advantages afforded. In the first place, a fully condensed resin is obtained at lower temperatures and in a much shorter time than heretofore possible. In the second place, by this procedure a purified resin is more readily obtained because the incompletely condensed resin is easily softened by hot water, and in suitable solvents forms solutions of low viscosity which are easily filtered. Thus, the intermediate reaction mass being less viscous, the by-product salt is more easily removed by washing with water. Also, since the less highly condensed resins are more easily dissolved in hydrocarbon solvents, the salt may be removed by simple filtration.

For more complete details of the methods and reactants used in preparing the polyether resins forming the starting materials of the present invention, reference may be had to the previously mentioned patents, especially 2,060,715. These resins may be defined as the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen. A preferred type of dihalide is that of the formula

$$X-(CH_2)_m-O-(CH_2)_n-X$$

where X is a halogen and $m$ and $n$ are whole numbers greater than one.

One method of treating the polyether resin with the poly-NCX compound consists in mixing a solution of the resin with a small amount of the reagent, usually not more than 5%, and then heating the mixture at temperatures of about 100° to 200° C. for about 1 to 3 hours, varying inversely with the temperature. The resulting composition can be used as a coating composition and the film air-dried, or baked, or air-dried and then baked. In an alternative procedure, a solution comprising the ether resin and reagent, which solution has not been heated, is applied as a coating composition, followed by baking at temperatures up to 200° C. or more. A satisfactory baking schedule is 100° C. for 16 hours, or 130° C. for ½ hour, or 150° C. for ¼ hour, or 200° C. for 5 minutes.

The optimum proportion of diisocyanate or equivalent compound which is added depends on the type of polyether resin used, its viscosity (or molecular weight), and also on the effect desired. Lowly condensed polyether resins having a low molecular weight and low viscosity characteristics require, for example, from about 1 to 5% of diisocyanate to produce a marked increase in viscosity. On the other hand, highly condensed resins, which have high molecular weight and high viscosity characteristics, require only a trace of diisocyanate to produce a marked increase in the average molecular weight and a corresponding increase in the solution viscosity. For a given resin, an increase of the proportion of diisocyanate reagent will produce an increase in the viscosity and a decrease in the solubility of the resin up to a certain point, after which a further increase in reagent has no further advantageous effect. The optimum proportion of reagent which is desirable is easily determined by simple testing, and it is best to establish the amount required for each resin composition. Solutions containing high proportions of reagent are undesirable in that they tend to be unstable and condense to insoluble gels on storage.

In both the above-noted general methods, the time and temperature are interdependent variables in that a high temperature requires only a short period of time to produce a given increase in viscosity, while low temperatures require a longer heating period. The time and temperature schedule employed also is influenced considerably by the concentration of diisocyanate reagent used. For example, up to a certain point, high concentrations of diisocyanate, e. g., 5% based on the resin, produce a more rapid increase in viscosity under given conditions of temperature and time than low concentrations of reagent. When high proportions of reagent are employed, it is sometimes desirable that the excess be prevented from reacting further with the resin by addition of alcohol, or similar solvent containing hydrogen atoms capable of reacting with the isocyanate groups. In general, however, it is desirable to use the required amount of diisocyanate and carry out the heat treatment in the presence of anhydrous solvents which do not react with the diisocyanate, for example, aliphatic or aromatic hydrocarbons such as xylene, toluene, and benzene, or aliphatic petroleum fractions such as kerosene, gasoline, and the like, or anhydrous ethers such as diethyl ether, dibutyl ether, and dioxan. Low proportions, i. e., 0.01 to 1.0% of soluble metallic driers, such as cobalt, manganese, and lead naphthenates, and, in certain cases, peroxide compounds such as benzoyl peroxide, accelerate the reaction of diisocyanate with ether resins. However, such accelerators or catalysts are not essential for the reaction to take place.

The following examples, in which parts given are by weight, are further illustrative of the practice of the invention.

*Example I*

A polyether resin is first prepared as follows: 120 parts di(4-hydroxyphenyl) dimethylmethane, 200 parts of 20% sodium hydroxide solution, and 71.5 parts of $\beta,\beta'$-dichlorodiethyl ether are stirred and refluxed for 24 hours. The water is then distilled off over a period of 2 hours and the temperature finally carried to 220° C. The viscous product is cooled to 100° C. and washed several times with water while stirring continuously, after which it is dried at 120° C. for about 16 hours.

A solution of the above resin is made by dissolving the dry resin in toluene and filtering to remove residual salt. A portion of the toluene is distilled from the solution to remove the last traces of water if the composition is not anhydrous. A toluene solution prepared by the above procedure and containing 48% resin has a viscosity of about 1.4 poises. Into this solution at room temperature is stirred 2% hexamethylene diisocyanate, 0.1% benzoyl peroxide, and 0.03% of cobalt naphthenate, all based on resin content. This solution is heated at 143 to 148° C. for one hour, which increases the viscosity to about 200 poises. Films of the treated resin are greatly superior in toughness, adhesion and water resistance to films of the untreated resin.

*Example II*

To the ether resin solution used in Example I is added 5% hexamethylene diisocyanate, based on the resin content, and the composition well mixed. The solution is applied to a glass surface and dried by baking at 100° C. for 1 hour. The heated coating shows improved toughness and water resistance compared with a similar coating of untreated resin. The baked film of treated resin is very nearly insoluble and is only slowly swelled when immersed in toluene solvent, while similar films of the original resin, prepared and dried under identical conditions but containing no diisocyanate, are easily dissolved in toluene.

*Example III*

A polyether resin is prepared from 1,1-bis-(4-hydroxyphenyl)-3,5-dimethylcyclohexane and $\beta,\beta'$-dichlorodiethyl ether according to Example II of Patent 2,058,510. The resin is dissolved in anhydrous toluene to give a solution of 35% resin content which solution has a viscosity of 0.5 poise. A portion of this solution is treated with 1% hexamethylene diisocyanate, based on the resin content, and used as a coating composition for No. 27 gauge copper wire. The copper wire is drawn through the coating solution and is then passed immediately through a vertical heating chamber 3 feet in length at a speed of 2 to 4 feet per minute, the temperature being 285° C. at the entrance point and at about 340° C. at the exit. The application of two successive coatings will give a film thickness of approximately 0.0005 inch. Additional coatings may be applied to give increased film thickness. Such coatings of treated resin show superior water resistance, adhesion and toughness as compared to coatings obtained similarly from untreated resins. Under the above-mentioned conditions, the untreated resin is not suitable when coatings heavier than about 0.0003 inch thickness are to be applied to the wire because the solubility of the untreated resin is not decreased by the baking treatment, which causes the resin to be partially dissolved from the wire upon recirculation through the coating solution.

*Example IV*

To 35 parts of a 70% toluene solution of the polyether resin prepared according to Example III of Patent 2,060,715 is added 0.14 part of 3% cobalt naphthenate solution and 0.13 part hexamethylene diisocyanate. The solution is well mixed and then flowed on glass plates. The flow-outs are baked at 100° C. for 1 hour. The baked films show a toughness and adhesion superior to that of films of the untreated resin. Moreover, the treated resin film is scarcely soluble in toluene, while the untreated resin film is readily soluble.

*Example V*

To 25 parts of a 20% toluene solution of the polyether resin prepared according to Example I of Patent 2,057,676 is added 0.28 part of 3% cobalt naphthenate solution and 0.2 part of hexamethylene diisocyanate. The solution is well mixed, flowed on glass plates, and the flow-outs are baked for 1 hour at 100° C. The baked films show greatly improved toughness and adhesion in comparison with similarly prepared films obtained from the same polyether resin containing no diisocyanate.

*Example VI*

To a toluene solution of 40 parts polyether resin prepared according to Example III of Patent 2,060,715 is added 0.1% cobalt as cobalt naphthenate and 5% of hexamethylene diisocyanate, both percentages based on the resin. The solution is allowed to stand at about 25° C. for 16 hours, during which time the solution becomes highly viscous. Flow-outs of the solution dry considerably faster at both ordinary temperature (25° C.) and at elevated temperature (100° C.) than similar flow-outs using the original polyether resin not treated with diisocyanate. Dry films of the modified polyether resin show superior toughness, adhesion, and water resistance as compared to similar films prepared from the unmodified polyether resin.

*Example VII*

To 60 parts of a 33% toluene solution of the polyether resin prepared according to Example III of Patent 2,060,715 is added 0.1% cobalt as cobalt naphthenate and 6% of decamethylene diisocyanate, both percentages being based on the resin. The solution is well mixed and flowed on steel plates to give a thin, evenly distributed coating. Upon baking at 120° C. for 1 hour, smooth, clear, dry films are obtained. These films are superior in toughness, flexibility and adhesion to films prepared in an identical manner from the resin containing no decamethylene diisocyanate.

*Example VIII*

To 60 parts of a 33% toluene solution of the polyether resin prepared according to Example III of Patent 2,060,715 is added 0.1% cobalt as cobalt naphthenate and 6% of m-phenylene diisocyanate, both percentages being based on the resin. The solution is mixed, flowed on steel plates, and films baked as described in Example VII. The coatings obtained are superior in flexibility, toughness and adhesion to films similarly prepared from the resin containing no m-phenylene diisocyanate.

The resins used in the foregoing examples can be replaced by others prepared from the wide variety of polyhalides and monomeric polyhydric phenols given in the previously mentioned patents.

Any poly-NCX compound can be used instead of those mentioned in the examples. Others that are suitable include dodecamethylene diisocyanate, ethylene diisocyanate, methylene diisothiocyanate, ethylene diisothiocyanate, p-phenylene diisocyanate, p-phenylene diisothiocyanate, m-phenylene diisothiocyanate, 2,3-dimethyltetramethylene diisothiocyanate, p-isocyanatobenzyl isocyanate, 1,4-diisocyanatocyclohexane, 1,2,3,4-tetraisocyanatobutane, bis-2-isocyanatoethyl ether or the corresponding sulfide, 2-chlorotrimethylene diisocyanate, p,p'-diphenylene diisocyanate, p,p'-diphenylene diisothiocyanate, 6-isocyanato-3-diphenylene diisothiocyanate, m-isocyanatocinnamyl isohexenyl isocyanate, m-isocyanatocinnamyl isocyanate, 5-nitro-1,3-phenylene diisocyanate, 1,5-diisocyanate-3-pentanone, and hexamethylene-1-isocyanate, 4-isothiocyanate.

The poly-NCX compound may thus be saturated or unsaturated; aliphatic or aromatic; open or closed chain, and, if the latter, monocyclic or polycyclic; and substituted or not by groups such as ketone, halogen, nitro, ester, sulfide and ether groups. The invention is more advantageously practiced with the polyisocyanates than with the polyisothiocyanates because of their greater reactivity, and of the former the aliphatic compounds, especially the polymethylene diisocyanates, are preferred. A particularly valuable embodiment of this invention consists in the treatment with hexamethylene diisocyanate of a polyether resin obtained from di(4-hydroxyphenyl)-dimethylmethane and $\beta,\beta'$-dichlorodiethyl ether.

The modified ether resins described herein are useful as coating compositions either alone or, in appropriate cases, blended with materials such as pigments, plasticizers, fillers, waxes, inhibitors, natural resins (such as rosin, kauri, and damar), natural resin derivatives (such as ethyl abietate, ester gum, and hydrogenated rosin), drying oils such as are compatible with ether resins under the conditions employed, bitumens such as asphalt and the like, or cellulose derivatives such as nitrocellulose, cellulose acetate, cellulose propionate, ethyl cellulose, and benzyl cellulose.

The pigments, fillers, resins, plasticizers, solvents, and the like can be added to the modified ether resin composition as needed or desired in accordance with methods known in the art. Pigmented or unpigmented films of the modified ether resins when applied to metal surfaces, are remarkably durable and give excellent protection from corrosion.

The modified ether resins are in many instances more advantageously used than the unmodified ether resins because films prepared from the modified resins possess improved toughness, adhesion, and water resistance, and in certain cases form highly insoluble films showing improved solvent resistance. These films show improved inertness to chemical and physical influences, such as acids, alkalies, heat and light. Such coatings can be applied over glass, cloth, paper, leather, rubber, stone, cork, metal, wood, nylon, and the like. Certain of the modified resins can be used as filaments or as foils. Compositions based on ether resins can also be used as adhesives and as sealing compositions.

A further valuable application of this invention resides in the fact that a plurality of coatings may be applied since the film of resin solution when dried shows greatly decreased solubility. In addition to the superior film properties of the present resins as compared to the unmodified ether resins, the practice of this invention is advantageous from the standpoint of economy and convenience in manufacture. Thus the polyether resins can be prepared in a lowly condensed stage in which stage they are readily purified, and the resin then converted by the present treatment to a highly condensed resin in a shorter time and at lower temperatures.

As many apparently widely different embodiments of this invention may be made without departing from the spirit and scope thereof, it is to be understood that I do not limit myself to the specific embodiments thereof except as defined in the appended claims.

I claim:

1. A composition of matter having as at least one component thereof an ingredient selected from the class consisting of a potentially reactive mixture of a polyether resin with an organic compound having a plurality of —NCX groups, and the product obtained by reacting said mixture by heat treatment, X in said groups being an element of group VI of the periodic table having an atomic weight less than 33, said polyether resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

2. A composition of matter comprising a potentially reactive mixture of a polyether resin with an organic compound having a plurality of —NCX groups in which X is an element of group VI of the periodic table and has an atomic weight less than 33, said polyether resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

3. A composition of matter comprising the reaction product of a polyether resin and an organic compound having a plurality of groups of the formula —NCX where X is an element of group VI of the periodic table and has an atomic weight less than 33, said polyether resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

4. The composition set forth in claim 1 in which said compound is a polyisocyanate.

5. The composition set forth in claim 1 in which said compound is an aliphatic diisocyanate.

6. The composition set forth in claim 1 in which said compound is a polymethylene diisocyanate.

7. The composition set forth in claim 1 in which said compound is hexamethylene diisocyanate.

8. A composition of matter having as at least one component thereof an ingredient selected from the class consisting of a potentially reactive mixture of hexamethylene diisocyanate and the polyether resin obtained from di(4-hydroxyphenyl)dimethymethane and $\beta, \beta'$-dichlorodiethyl ether, and the product obtained by reacting said mixture by heat treatment.

9. A liquid coating composition which comprises in substantial amount the composition defined in claim 2.

10. A liquid coating composition which comprises in substantial amount the composition defined in claim 3.

11. A process which comprises reacting with heat treatment a polyether resin and an organic compound having a plurality of groups of the formula —NCX where X is an element of group VI of the periodic table and has an atomic weight less than 33, said polyether resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

12. The process set forth in claim 11 in which said compound is a polyisocyanate.

13. In the manufacture of polyether resins from monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen, the steps which comprise stopping the resin forming reaction at an intermediate stage, reacting the lowly condensed resin thus obtained with a compound having a plurality of —NCX groups, X being an element of group VI of the periodic table having an atomic weight less than 33, and continuing the heating until a highly condensed resin is obtained.

14. A process which comprises applying a film from a coating composition comprising a potentially reactive mixture of a polyether resin with an organic compound having a plurality of —NCX groups and then reacting said resin and compound in the film by baking the film, said polyether resin being the reaction product of a substantially unpolymerizable monomeric polyhydric phenol and an organic polyhalide, free of ester groups, whose halogen atoms are all attached to different carbon atoms which are in turn joined, by single bonds only, to at least one carbon, any valences not satisfied by carbon being satisfied by hydrogen.

HENRY S. ROTHROCK.